United States Patent
Neville et al.

(10) Patent No.: US 7,497,699 B2
(45) Date of Patent: Mar. 3, 2009

(54) JUNCTION BOX ASSEMBLY WITH T-SHAPED ALIGNING PROTRUSION

(75) Inventors: Emily A. Neville, Taylor, MI (US); Brian D. Carnick, New Baltimore, MI (US)

(73) Assignee: Sumitomo Electrical Wiring Systems - Detroit Technical Center, Inc, Northville, MI (US)

( * ) Notice: Subject to any disclaimer, the term of this patent is extended or adjusted under 35 U.S.C. 154(b) by 3 days.

(21) Appl. No.: 11/710,971

(22) Filed: Feb. 27, 2007

(65) Prior Publication Data
US 2008/0203039 A1   Aug. 28, 2008

(51) Int. Cl.
*H01R 12/00* (2006.01)
(52) U.S. Cl. ..................... 439/76.2; 439/701
(58) Field of Classification Search ................. 439/76.2
See application file for complete search history.

(56) References Cited

U.S. PATENT DOCUMENTS 3,874,762 A * 4/1975 Shott et al. .................. 439/425
6,015,303 A   1/2000 Bonilla et al.
6,375,517 B1 * 4/2002 Okabe et al. ................ 439/701
2006/0160380 A1 * 7/2006 Korsunsky et al. ............ 439/74

FOREIGN PATENT DOCUMENTS

JP   A 07-212938   8/1995

OTHER PUBLICATIONS

Junction Box Product.

* cited by examiner

*Primary Examiner*—Truc T Nguyen
(74) *Attorney, Agent, or Firm*—Oliff & Berridge, PLC

(57) ABSTRACT

A junction box assembly includes first and second structures, such as upper and lower cases. T-shaped aligning protrusions extend beyond an edge of a sidewall of the second structure and mate with a receiving member contained in the first structure. When the first structure is being aligned with the second structure, chamfers on the T-shaped aligning protrusion may be provided to help start the alignment process before the first and second structures are joined together. This allows for faster and easier assembly of the junction box and helps to reduce the mating forces between the first and second structures.

4 Claims, 4 Drawing Sheets

JUNCTION BOX ASSEMBLY WITH T-SHAPED ALIGNING PROTRUSION

BACKGROUND

This invention relates to a junction box assembly, such as an electrical junction box assembly that mounts on a vehicle or the like.

In various junction box assembly processes, a first casing is mated with a second casing and then locked together. Properly positioning and aligning the first casing to the second casing in order to assemble the junction box can be both difficult and time consuming, especially in the context of an assembly line or the like in which many repetitions of an assembly process are performed.

SUMMARY

As junction box casings increase in size, it becomes even more difficult to position the upper casing with respect to the lower casing for assembly. A conventional junction box has a first casing with a first sidewall edge and a second casing with a second sidewall edge. The second casing is provided with T-shaped ribs to restrict the sidewalls of the first casing and the second casing from separating from each other by deforming. These T-shaped ribs only extend up to the second sidewall edge of the sidewalls of the second casing in the conventional art.

As shown in FIG. 1, by providing T-shaped aligning protrusions 200 on a second casing 20 that extend beyond the second sidewall edge 24 of the sidewalls 26, and mating the T-shaped aligning protrusion with a receiving member (not shown in FIG. 1) in the first casing 10, faster and more accurate assembly of the junction box can be achieved. Moreover, when the first casing is being aligned with the second casing, chamfers on the T-shaped aligning protrusion may be provided to help start the alignment process before the sidewalls of the first and second casing come together. These chamfers help to reduce the mating forces between the first and second casings.

Embodiments of this invention increase ease of alignment of the first and second casing by providing T-shaped aligning protrusions at the first and/or second casing of the junction box.

These and other objects, advantages and salient features of the invention are described in or apparent from the following description of embodiments.

BRIEF DESCRIPTION OF THE DRAWINGS

Exemplary embodiments will be described with reference to the accompanying drawings, in which like numerals represent like parts, and wherein.

DETAILED DESCRIPTION OF EMBODIMENTS

A conventional junction box assembly has a first casing and a second casing. The second casing is provided with T-shaped ribs to prevent sidewalls of the first casing and the second casing from separating from each other by deforming. More specifically, a sidewall of the first casing slides past a sidewall of the second casing, when the first and second casings are engaged with each other, such that an inward-facing surface of the sidewall faces an outward-facing surface of the sidewall. The T-shaped ribs engage with corresponding receiving members formed on the inside surface of the sidewall, and thereby prevent the sidewall from deforming outward and thus becoming separated from the sidewall. Such separation would be undesirable because of the open gap that would be formed between the two sidewalls. Generally, the T-shaped ribs only extend up to the second sidewall edge of the sidewalls of the second casing in the conventional art.

Figure 1:
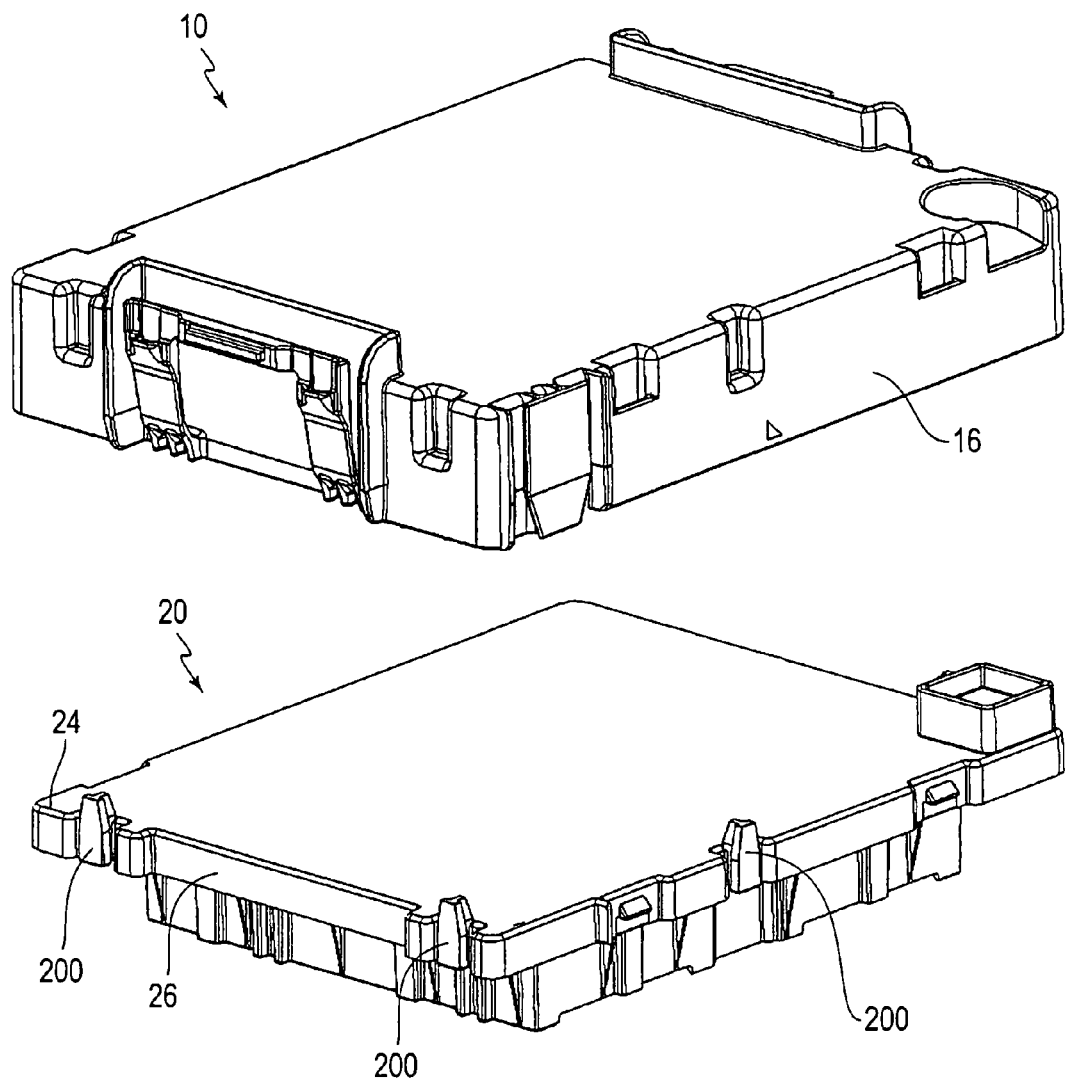
FIG. 1 is an exploded perspective view of a junction box with T-shaped aligning protrusions.

FIG. 1 illustrates a junction box assembly according to an exemplary embodiment. T-shaped aligning protrusions 200 are provided on a second casing 20. The T-shaped aligning protrusions 200 extend beyond the second sidewall edge 24 of the second casing 20, and mate with a receiving member (not shown in FIG. 2) of the first casing 10. The T-shaped aligning protrusions 200 extend beyond the second sidewall edge 24 by a certain amount. The amount may be in a range of from about 0.25 inches to about 5.0 inches, such as, e.g., about 0.5 inches, about 0.75 inches, about 1.0 inches, about 2.0 inches, or about 3.0 inches. The T-shaped aligning protrusions 200 may extend beyond the second sidewall edge of the second casing 20 for a distance about equal to the height of the sidewall 26 of the second casing 20, as shown in FIG. 1, or a distance longer or shorter than the height of the sidewall 26. Although not depicted, various fuses, relays, transistors, connectors, bus bars, circuit boards, and/or the like may be accommodated within the junction box assembly.

As used in this disclosure, "T-shaped" is not limited to the shape shown in the depicted exemplary embodiments, and encompasses any shape in which a first portion having a relatively large width is attached to a second portion having a relatively smaller width, such as a mushroom shape, a keyhole shape, etc., in addition to more traditional "T" shapes. The small-width portion of the T-shaped member attaches to a first junction box structure (such as a casing), such as at the sidewall or another suitable surface facing substantially perpendicular to a direction of engaging the first junction box structure with a second junction box structure. When the first and second junction box structures are engaged, a receiving member holds the large-width portion of the T-shaped member so that the large-width portion cannot disengage from the receiving member in a direction perpendicular to the direction of engaging the first junction box structure with a second junction box structure.

Figure 2:
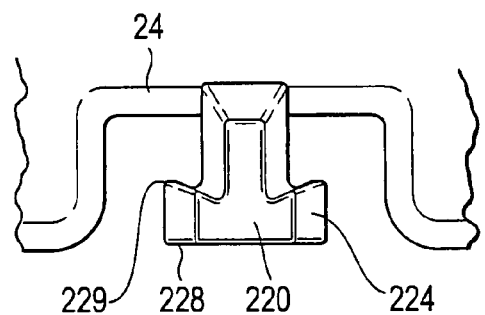
FIG. 2 is a top view that illustrates a T-shaped aligning protrusion of FIG. 2 prior to engagement.
Figure 3:
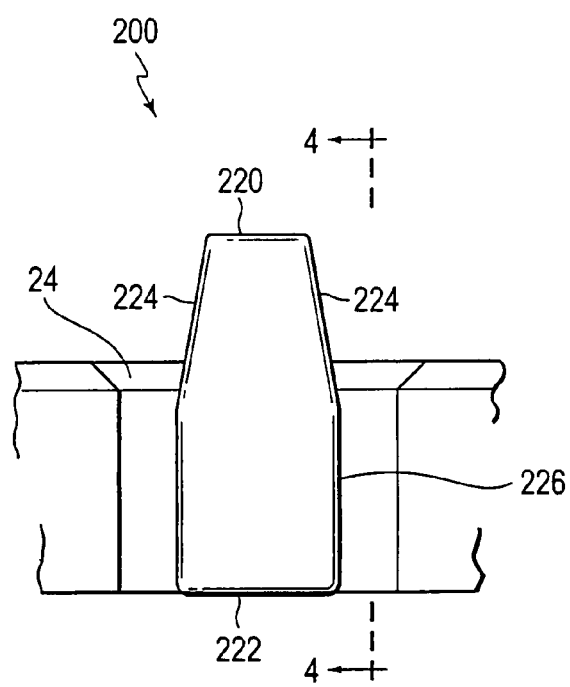
FIG. 3 is a front view that illustrates the T-shaped aligning protrusion prior to engagement.
Figure 4:
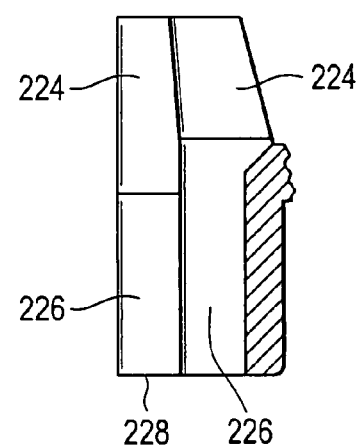
FIG. 4 is a side view that illustrates the T-shaped aligning protrusion prior to engagement.

FIGS. 2, 3, and 4, illustrate an embodiment of a T-shaped aligning protrusion 200. The T-shaped aligning protrusion 200 includes an upper surface 220, a lower surface 222, chamfers 224, sidewalls 226, extensions 228, and inward-facing corners 229. The chamfers 224 allow the T-shaped aligning protrusion to easily be guided into a receiving member (described below). The upper end of the T-shaped aligning protrusion 200, including the upper surface 220, may be inserted into the receiving member to help the alignment process between the first casing and the second casing. Additionally, the extensions 228 interlock with the receiving member to keep the T-shaped aligning protrusion engaged with the receiving member. As shown in FIG. 3, in this embodiment, inward-facing corners 229 of the T-shaped aligning protrusion 200 are tapered in plan view, rather than being right-angled corners.

Figure 5:
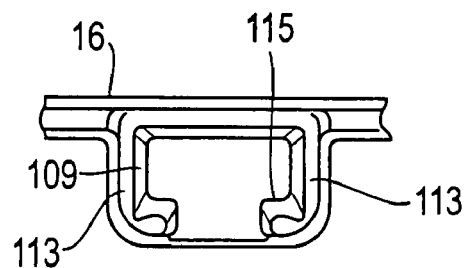
FIG. 5 is a top view that illustrates a receiving member prior to engagement.
Figure 6:
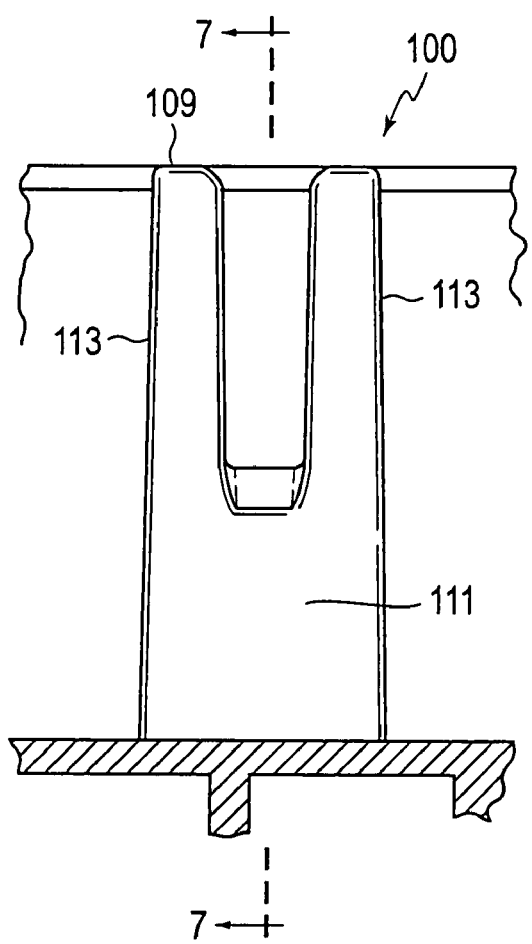
FIG. 6 is a front view that illustrates the receiving member prior to engagement.
Figure 7:
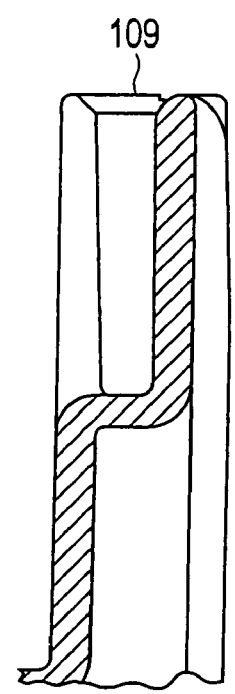
FIG. 7 is a side view that illustrates the receiving member prior to engagement.

FIGS. 5, 6, and 7 illustrate an exemplary receiving member 100. The receiving member 100 has an end surface 109, a base portion 111, and a pair of engaging brackets 113 that extend from the base portion 111. The engaging brackets 113 are spaced from each other at a distance corresponding approximately to the width of the lower surface 222 of the T-shaped aligning protrusion 200 so as to provide space for the entry of the T-shaped aligning protrusion between the engaging brackets. The engaging brackets 113 are configured to allow the T-shaped aligning protrusion 200 to slide into the space between the engaging brackets 113. As shown in FIG. 5, inward-facing surfaces 115 of the receiving member 100 extend substantially parallel to sidewall 16.

Figure 8:
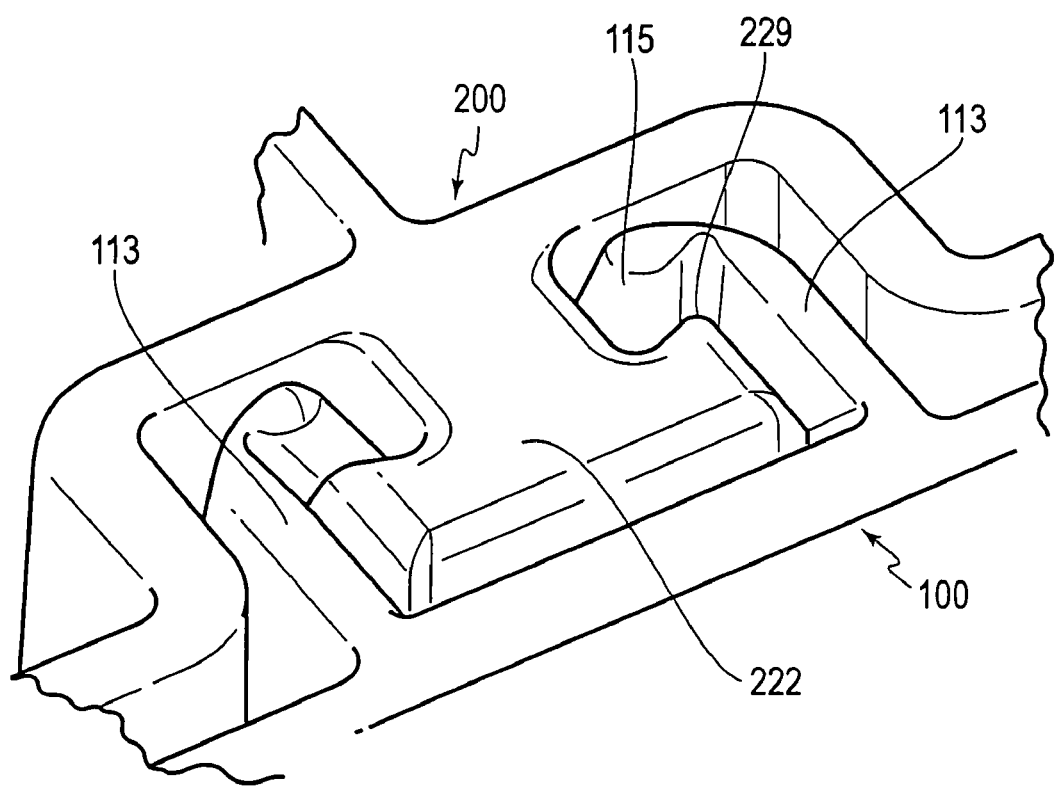
FIG. 8 is an oblique view that illustrates a fully engaged state of the T-shaped aligning protrusion and the receiving member of FIGS. 3-8.

As shown in FIG. 8, as the T-shaped aligning protrusion 200 proceeds to its final engagement position with respect to the receiving member 100, the T-shaped aligning protrusion 200 slidably engages with the engaging brackets 113 of the receiving member 100. Additionally, the lower surface 222 of the T-shaped aligning protrusion 200 moves towards the upper surface 109 of the receiving member. During this action, the chamfers 224 make it easy to guide the end of the T-shaped aligning protrusion 200 into the open end of the receiving member 100. Additionally, the inward-facing corners 229 of the T-shaped aligning protrusion 200 engage the inward facing surfaces 115 of the receiving member 100 in a substantially line contact manner, rather than a plane contact manner. This helps reduce the actual force necessary to push the T-shaped aligning protrusion 200 into the receiving member 100. The sidewall 16 of the first casing 10 may slide past the sidewall 26 of the second casing 20, such that an inward-facing surface of the sidewall 16 faces an outward-facing surface of the sidewall 26. The T-shaped aligning protrusions 200 engage with corresponding receiving members formed on the inside surface of the sidewall 16, as described above, and thereby prevent the sidewall 16 from deforming outward and thus becoming separated from the sidewall 26.

While the invention has been described in conjunction with a specific embodiment, this embodiment should be viewed as illustrative and not limiting. Various changes, substitutes, improvements or the like are possible within the spirit and scope of the invention.

For example, the number of T-shaped aligning protrusions 200 in the second casing is not limited to the three depicted in FIG. 1, but may be any number, including one.

As another example, the location of the T-shaped aligning protrusion is not limited. Specifically, the T-shaped aligning protrusion may be located in the first casing 100 and the receiving member may be located in the second casing 200 or the first and second casings could contain both T-shaped aligning protrusions and receiving members. As another example, the T-shaped aligning protrusion could be located on an interior wall or surface of the first or second casing.

What is claimed is:

1. A junction box assembly, comprising:
    a first structure with a first sidewall, the first structure having a receiving member; and
    a second structure with a second sidewall, the second structure having a T-shaped aligning protrusion extending beyond an edge of the second sidewall in an engagement direction,
    wherein the receiving member begins to mate with the T-shaped aligning protrusion before the first sidewall and the second sidewall come into contact as the first and second structures are engaged in the engagement direction, and
    the T-shaped aligning protrusion includes a small-width portion and a large-width portion which is attached to the small-width portion, the large-width and small-width portions extending along the second sidewall and beyond the edge of the second sidewall in the engagement direction, the large-width portion being received in the receiving member so that the large-width portion restricts the second sidewall from separating from the receiving member in a direction perpendicular to the engagement direction when the first and second structures are engaged.

2. The junction box assembly of claim 1, wherein the T-shaped aligning protrusion extends beyond the edge of the second sidewall for a distance about equal to a height of the second sidewall.

3. The junction box assembly of claim 1, wherein the T-shaped aligning protrusion includes a chamfered edge extending from an upper surface of the T-shaped aligning protrusion to a side surface of the T-shaped aligning protrusion.

4. A vehicle comprising the junction box assembly of claim 1.

* * * * *